US007644100B2

(12) United States Patent
Chang et al.

(10) Patent No.: US 7,644,100 B2
(45) Date of Patent: Jan. 5, 2010

(54) DYNAMIC ACCESSIBLE REPORTING TOOL (DART)

(75) Inventors: Chengping Chang, Piscataway, NJ (US); Shubhendu Das, Edison, NJ (US); Jeff Gorvits, Morton Grove, IL (US); Sunil Unnithan, Mumbai (IN); Amit Goel, Lisle, IL (US); Matthew Balda, Aurora, IL (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 11/900,841

(22) Filed: Sep. 12, 2007

(65) Prior Publication Data

US 2008/0091709 A1 Apr. 17, 2008

Related U.S. Application Data

(60) Provisional application No. 60/844,155, filed on Sep. 12, 2006.

(51) Int. Cl.
*G06F 7/00* (2006.01)
*G06F 17/00* (2006.01)

(52) U.S. Cl. .................. 707/102; 707/103 Y
(58) Field of Classification Search ........... None
See application file for complete search history.

(56) References Cited

U.S. PATENT DOCUMENTS

| 6,327,594 | B1 * | 12/2001 | Van Huben et al. | 707/200 |
|---|---|---|---|---|
| 6,385,644 | B1 * | 5/2002 | Devine et al. | 709/206 |
| 6,615,258 | B1 * | 9/2003 | Barry et al. | 709/223 |
| 6,748,384 | B1 * | 6/2004 | Rylander et al. | 707/10 |
| 2001/0052108 | A1 * | 12/2001 | Bowman-Amuah | 717/1 |
| 2002/0095399 | A1 * | 7/2002 | Devine et al. | 707/1 |
| 2003/0001896 | A1 * | 1/2003 | Johnson et al. | 345/771 |
| 2004/0034615 | A1 * | 2/2004 | Thomson et al. | 707/1 |
| 2004/0044763 | A1 * | 3/2004 | Besson | 709/224 |
| 2005/0004947 | A1 * | 1/2005 | Emlet et al. | 707/104.1 |
| 2005/0223109 | A1 * | 10/2005 | Mamou et al. | 709/232 |
| 2005/0289136 | A1 * | 12/2005 | Wu et al. | 707/4 |
| 2006/0277211 | A1 * | 12/2006 | Error | 707/102 |
| 2007/0179975 | A1 * | 8/2007 | Teh et al. | 707/104.1 |
| 2007/0203935 | A1 * | 8/2007 | de Souza | 707/102 |

* cited by examiner

*Primary Examiner*—Mohammad Ali
*Assistant Examiner*—Angelica Ruiz
(74) *Attorney, Agent, or Firm*—Weitzman Law Offices, LLC

(57) ABSTRACT

A flexible metadata driven and workflow based report generation system is disclosed. The system comprises a Flexible Reporting GUI with four components that allow the user direct control in the creation of a report within a single application: a Data Generator for retrieving data, a Report Designer with a built-in report designer application, a Report Deployment element for deploying the report and an Report Run element for interactively running the report. The Flexible Reporting GUI allows a user to run a report with updated data stores, and to define the various parameters that affect the content of the generated report with great flexibility. Through the system of the invention, the user can be directly involved in all the report generation steps, through a user friendly interface, and a simplified environment. Moreover, the system in the invention provides improved solutions for updated data retrieval from protected data sources.

13 Claims, 13 Drawing Sheets

FIG. 3A

Advanced Data Selection for Holdings and Transactions

Loaded Report Designer Application Semantic layer

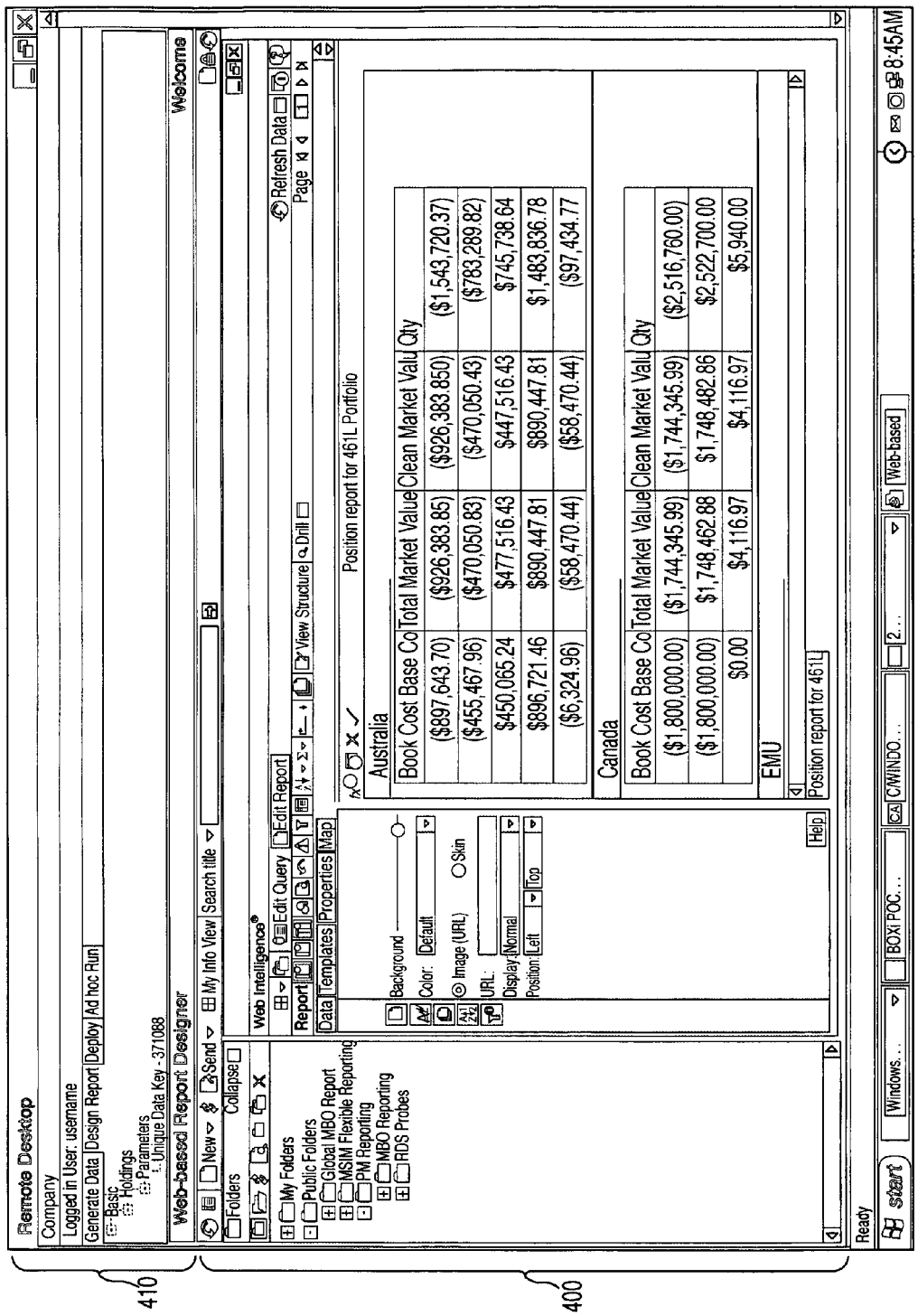
FIG. 6A  Run Report Within Designer

FIG. 7

DYNAMIC ACCESSIBLE REPORTING TOOL (DART)

CROSS-REFERENCE TO RELATED APPLICATION

This application claims the benefit of the filing date of U.S. provisional application Ser. No. 60/844,155 entitled "Dynamic Accessible Reporting Tool (DART)," which was filed on Sep. 12, 2006.

FIELD OF THE INVENTION

The present invention generally concerns information technology systems and, in particular, a system for generating, designing, publishing and running reports or extracts (data feeds). Specifically, the present invention concerns a system named Flexible Reporting System, also known as Dynamic Accessible Reporting Tool (DART). Throughout this document, the system of the invention may be referred to as DART, although both names refer to the same system, and are interchangeable.

BACKGROUND

The financial services industry relies heavily on reports and reporting services/systems as an important medium for communicating with clients and potential clients. A report is an organized collection of data formatted for viewing or printing in a user-friendly way. A report might communicate time critical information about investments, including a fund/portfolio performance, present market value, a summary of gains/losses, and other information.

The typical challenge faced by designers of large scale enterprise reporting systems in the financial services industry is trying to integrate a mixture of commercial vendor applications with home grown applications so that reporting can be done in flexible and scalable ways. Some of the challenges report designers face relate to licensing and scalability. Other hurdles report designers face within the environment of large enterprises, is data access and retrieval.

In large-enterprise environments, where databases are securely protected by data services applications, vendor report design applications cannot carry out a direct query of the enterprise databases, as their access to such databases is restricted. The protected data needed by the user must then be retrieved from the protected databases through a separate process, often involving Information Technology (IT) specialist(s) within the enterprises, and must then be delivered to the report design application of choice. One of the possible ways to retrieve the data is for the IT specialist(s) to build a data warehouse at certain time intervals (e.g. daily) that is accessible to the report design application. However, the creation and maintenance of the data warehouse needed for this solution involves a high cost. Moreover, the data that is accessible to the user is never current, as it is limited by the time period that is chosen to create the warehouse. For example, in the case that the database is run overnight, the data will always be one day old. This is not in line with the demands of users in an enterprise environment, who usually need to create reports on up-to-date data. A second option the IT specialist(s) have is to retrieve data from enterprise databases through third party applications, and to then deliver the data to the reporting application. In some of these third party applications, the data retrieval is done in real-time, through complex in-memory data joins, by keeping the data in virtual tables in memory. Such multi-application, multi-vendor approaches can be expensive, inflexible, and difficult to administer and maintain. In addition, existing third party applications do not often have the maturity, stability, speed and flexibility sufficient to effectively retrieve the data for delivery to the report design application. Thus, alternative solutions are needed in order to respond to the demands of users in large enterprise environments.

One alternative that has been developed in response to these needs is described in U.S. patent application Ser. No. 11/119,008 "A workflow based and metadata driven reporting system," and it is hereby incorporated by reference. This patent application describes a system that allows generation of reports by retrieving the data through a controller. A user is then allowed to select one of a defined set of report design templates and schedule an ad-hoc or batch run of the report. If the report templates do not match the needs of the user, changes to the report templates can be made through an administration application, which will then update the report database that the user taps into.

Report design users are increasingly requesting a closer involvement in the report design process and higher flexibility of the design application. First, users are requesting a shorter turn-around time in producing a new report. The available vendor solutions for creating a new report often have a long turn-around time, which can extend to even days. The first reason for this long turn-around time is that the involvement of IT specialist(s) is needed at many stages of the report production. Typically, the IT specialist(s) first meet with users in order to gather the requirements conveyed by the user. Then, the IT specialist(s) need to analyze the data sources to find out if all data points are available. Next, the IT specialist(s) need to implement a new data extracting process in order to make missing data points available. Report design vendor applications cannot readily integrate the necessary data in the instance complex linkage of data records from the enterprise databases is necessary. The IT specialist(s) may also need to create a new report template, which may additionally involve the collaboration with a different specialized IT team. Next, the IT specialist(s) will need to add the new report in the current reporting system. In addition, the IT specialist(s) will need to verify that the new report is produced as required. Lastly, the IT specialist(s) will need to communicate back with users about the availability. This process may iterate a few times if any issue or error is identified, and each iteration increases the turn-around time. The turn-around time affects the client take-on process directly. When a new client requires a specific report on specific data, and the business cannot deliver it in a timely fashion, the client may turn to other companies.

The second limitation is the cost involved in the data source technology that the current vendor solutions in the reporting space require. The current vendor solutions require that the data be consolidated in one place which is usually known as a data warehouse. Building a data warehouse is not only expensive, but also time consuming. A typical data warehouse would take a few months to design and to implement. A data warehouse would also require huge data storage. The cost incurred in maintaining such data storage is also high, and not all reporting requirements can justify such cost. Implementing this solution represents a waste of resources.

Another limitation of the current systems is that only canned scheduled reports are supported. This is due to the fact that in order to have IT staff support a system, formal documentation and appropriate training is usually required. Also required is budgeting and resource planning These factors limit the type of reports that IT can support Usually monthly reports can be supported. Ad hoc and portfolio manager reports are hard to support because they have too many variables. Ad hoc and portfolio manager reports are usually supported in a case by case situation, hence incurring in a higher cost.

Accordingly, an improved system is needed. The system of the invention, DART, is designed to address all the user requirements described above, i.e. shorter turn-around time, increased available data points, increased report formats and more direct control on the report production process by the user, without requiring involvement of IT specialist(s).

SUMMARY OF THE INVENTION

In one general aspect, the invention comprises a method for running a data report comprising: initiating a graphical user interface comprising four components, wherein said components comprise a data generator component, a report designer component, a report deployment component and a report run component; retrieving data from a first database by selecting said data through said data generator component, wherein said first database is securely protected; designing said report by selecting report parameters through said report designer component; and running the report through said report run component.

In a particular aspect of the invention, the method further comprises extracting report metadata from the designed report through said report deployment component.

In an embodiment of the invention, said data generator component retrieves the data selected from said first database through reporting architecture and data services.

In another embodiment of the invention, said retrieving step further comprises sending a data request to said first database, wherein said data request corresponds to a plurality of data records within said first database, and wherein each data record within each of said plurality of data records corresponding to the same data request has a unique key corresponding to said data request.

In another embodiment of the invention, the retrieving step further comprises storing the retrieved plurality of data records in a second database comprising staging tables, wherein said staging tables are configured to be shared by a plurality of users.

In another embodiment of the invention, said designing step further comprises loading a web based designer application, said designer application establishing a semantic layer on said second database.

In another embodiment of the invention, said plurality of data records correspond to a plurality of data categories in said first database, and said plurality of data records corresponding to said plurality of data categories are stored within a corresponding plurality of records and a corresponding plurality of tables within said second database.

In another embodiment of the invention, said plurality of records having the same unique key within each of said plurality of tables within said second database are linked in a single record, and said single record is stored in a third database.

In another embodiment of the invention, the extracting step further comprises storing said report metadata in a report metadata database.

In another embodiment of the invention, the running step comprises a run method selected from the group consisting of: an ad hoc run method and a batch run method.

In a second general aspect, the invention comprises a data storage medium comprising instructions for causing a computer to: generate a user interface comprising a data generator component for a data retrieval from a first database, wherein said database is securely protected, a data report designer component for selecting report parameters, a report deployment component for extracting report metadata, and a report run component for running said data report; retrieve data from said database through said data generator component; design a report through said designer component; and run said report through said report run component.

In a particular aspect of the invention, the data storage medium further comprises instructions for causing a computer to extract report metadata through said report deployment component.

In a third general aspect, the invention comprises a system for running a data report from data stored in a database comprising: a first database, wherein said first database is securely protected; a graphical user interface comprising: a data generator component for a data retrieval from said first database, a data report designer component for selecting report parameters, a report deployment component for extracting said report parameters, and a report run component for running said data report; reporting architecture; a second database, wherein said database comprises staging tables; and a report metadata database.

DESCRIPTION OF THE DRAWINGS

For a fuller understanding of the invention, reference is made to the following description taken in conjunction with the accompanying drawings, in which:

FIG. 2 is a schematic representation of how a staging database preserves the data structure categories as they are found in the original databases where the data are retrieved from.

FIG. 7 displays a representative screen view of the Report Deployment 1*c* GUI Component in one embodiment of the invention.

DETAILED DESCRIPTION OF THE PREFERRED EMBODIMENTS

Figure 1:
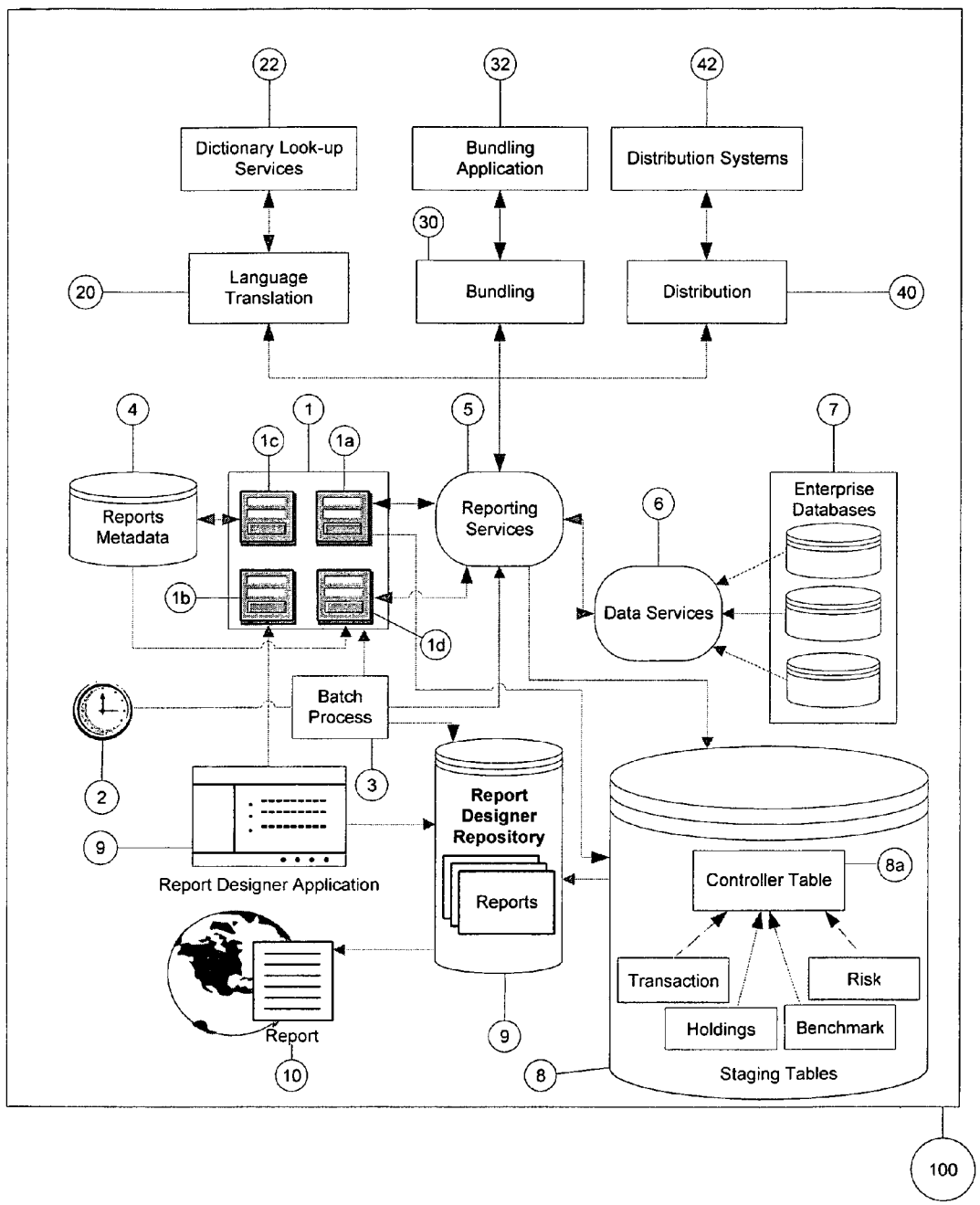
FIG. 1 is a graphical representation of an overview of the DART architecture in an embodiment of the invention.

FIG. 1 is a diagram of a workflow-based and metadata-driven reporting system 100 according to various embodiments of the present invention. The components of system 100 may be implemented as an architecture of one or a number of distributed networked computing devices, such as PCs, servers, workstations, etc., programmed to retrieve data, design reports, extract report metadata and run reports by users of the system 100. A user accesses the system 100 through a client terminal. The client terminal may be implemented, for example, as a computing device, such as a PC, laptop or workstation, in communication with the system 100 components via a data network (not shown), such as, for example, a LAN, a WAN, etc. . . . It should be recognized that the system 100 may be accessed by numerous client terminals located throughout an enterprise. Further, in certain embodiments, the system 100 can simultaneously be accessed by multiple client terminals in a transport independent way. For example, the communications between the system 100 components and the client terminals may employ the HTTP, MQ and/or TCP communication protocols. The communication could be either synchronous (the client application waits to get responses back) or asynchronous (e.g., the client receives responses that are published by the system 100 as and when they get published).

The client terminal includes a client application which provides a graphical user interface (GUI) display window, such as the Flexible Reporting GUI 1 of the embodiment of the invention represented in FIG. 1. The Flexible Reporting GUI 1 may or may not be based on an internet browser. The Flexible Reporting GUI 1 may be implemented as software code to be executed by a processor of the client terminal using any suitable computer instruction type such as, for example, Java, C, C++, Visual Basic, Pascal, Fortran, SQL, etc. . . . , using, for example, conventional or object-oriented techniques. The client code might reside on the user desktop or might be accessible over the network. The software code may be stored as a series of instructions or commands on a computer readable medium. In other embodiments, the Flexible Reporting GUI 1 may be stored on a remote server, and the client terminal may execute the application through a browser application.

Figure 3B:
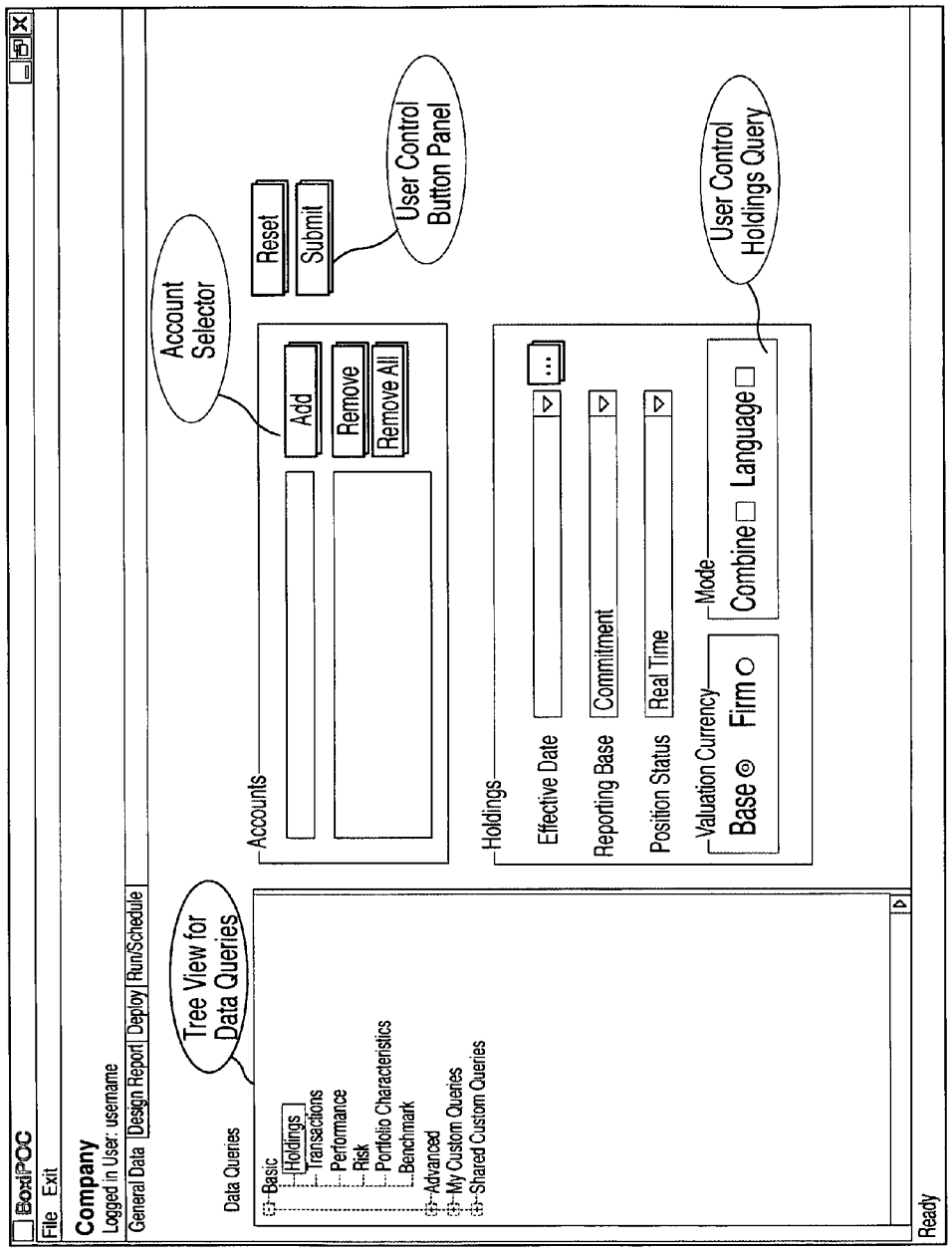
FIGS. 3A and B display representative screen views of the Data Generator 1*a* GUI component in one embodiment of the invention.

After initiating the Flexible Reporting GUI 1, the user may first log in by entering a user ID and password. This will grant access to the user to the four components of the Flexible Reporting GUI 1: the Data Generator 1a, the Report Designer 1b, the Report Deployment element 1c and the Report Run element 1d. A start up menu may provide the user with the option to access any of these elements with the purpose of carrying out their respective functions, namely, retrieving data for the new report (Data Generator 1a), designing the new report (Report Designer 1b), deploying the report (Report Deployment element 1c), or running the report (Report Run element 1d). FIG. 3A shows such a menu in an embodiment of the invention. The user may then select the desired Flexible Reporting GUI 1 component, for example, through any known and/or conventional user interface technique, such as hitting the "Enter" key when the desired component is highlighted, right-clicking on a mouse when the desired option is highlighted from a number of tabs or drop-down menu options, using selection arrows, etc. . . . Any of these selection techniques will apply to all instances of option selection throughout this patent application. In the embodiment of the invention depicted in FIG. 3A, each one of the Flexible Reporting GUI 1 components is represented by a tab that the user can click on. The "Generate Data" tab will access the Data Generator 1a component; the "Design Report" tab will access the Report Designer 1b component; the "Deploy" tab will access the Report Deployment element 1c and the "Run/Schedule" tab will access the Report Run element 1d. In one embodiment of the invention, the four elements of the Flexible Reporting GUI 1 are merged into a single application.

The selections available to the user in the Flexible Reporting GUI 1 may be based on the entitlements of the user, and if so, this will be determined upon user logon. For example, certain users may only be able to generate certain types of reports. Information about the entitlements of the user may be stored by the system 100 as described below.

Figure 2:
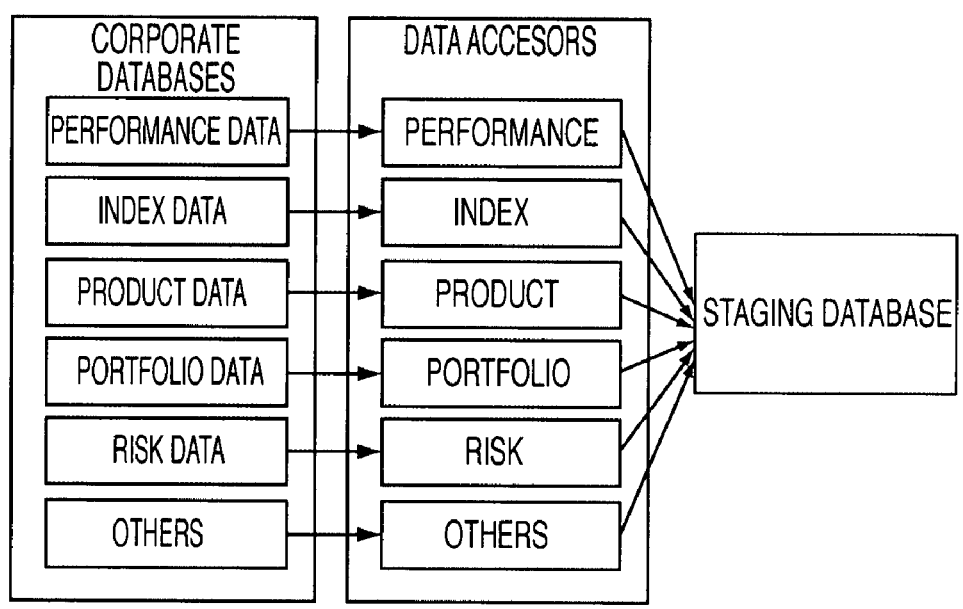

Data Generator element 1a is the element through which the user can select the data to be incorporated into the report. In the embodiment of the invention shown in FIG. 3A, the user accesses this component by clicking on the tab labeled "Generate Data." The data that the user wants to incorporate into the report will be retrieved from the database(s) where it resides through Data Accessors run by Reporting Architecture 5 in communication with Data Services 6. Data Accessors are programs that retrieve data from databases where the data is stored such as Enterprise Databases 7 depicted in the embodiment of the invention of FIG. 1, or other data provider services, files, etc. . . . These data storage media may be securely protected and access to the data will only be allowed through data services. The databases can store multiple types of data such as: performance data, index data, product data, portfolio data, risk data, etc. . . . Data Accessors are generic components that target specific kinds of data and maintain the data categories that exist in the original database as depicted in FIG. 2. Examples of Data Accessors are holdings Data Accessors, transactions Data Accessors, performance Data Accessors, data categories, benchmark Data Accessors, etc. . . . By using Data Accessors, users do not need to know the underlying data structure of the databases where the data is actually stored, but simply need to input a few parameters to indicate the data that must be retrieved by the Data Accessors. Data Accessors by virtue of being generic, simplify the access of multiple users and their respective diverse parameters, to complex and diverse data sources.

The system 100 may include one or more fault tolerant, metadata-driven workflow Reporting Architecture elements 5. Only one Reporting Architecture element 5 is shown in FIG. 1 for purposes of simplicity.

Reporting Architecture 5 will communicate the user data retrieval request to the Data Services 6 through a message request. The message request may be, for example, a SOAP (Simple Object Access Protocol) XML message. SOAP messages are used to enable the exchange of a variety of XML information between server and client computers. Reporting Architecture 5 may also store the relevant data in files (such as flat or XML files) or in a staging database such as the Reporting Database 8 for use in other future workflow steps of the report generation process. A staging database such as the Reporting Database 8 is shared by multiple users, and every user may have more than one data request. In addition, every data request, may correspond to multiple records, each retrieved from the respective data categories. In order to link together the various data records corresponding to the same data request, each record to be used in a particular data request is stored with an associated field encoding a "Unique Key" that identifies every single data record retrieved for the same data request. In that way, other report services can locate and use the appropriate data for a particular report design by using the data associated with the Unique Key for that specific data request. In an embodiment of the invention, the Unique Key is assigned by Reporting Architecture 5.

In another embodiment of the invention, the user obtains a view of the tree of Data Accessors through the Data Generator element 1a. In this manner, a user will be able to visualize the different Data Accessors through which the data may be retrieved. This is shown in the embodiment of the invention depicted in FIG. 3A. In this embodiment, the tree of Data Accessors appears in the window on the left labeled as "Data Queries." In one embodiment of the invention, such as the one depicted in FIG. 3A, the Data Accessors may appear organized in folders and/or subfolders (e.g. basic, advanced, etc. . . . )

The user may then select the desired Data Accessor, through any of the interface techniques mentioned earlier. In the embodiment of the invention depicted in FIG. 3A, the user clicks on the checkboxes corresponding to the Data Categories desired. A user may select multiple Data Accessors, and in this case, the selected Data Accessors and their options will be displayed to the user. In the embodiment of the invention depicted in FIG. 3A, the user has selected the Holdings and Transactions Data Accessors, and a number of fields corresponding to the data query options available through these Data Accessors are displayed. Account and Button panels are available and displayed for all query types. As mentioned earlier, the Data Accessors displayed may be dependent upon the entitlements of the user.

Once the types of data that the user wants to incorporate into the report have been selected, the user can submit the query to the Reporting Architecture 5 by clicking on a "Submit" button. This will trigger the beginning of data retrieval through the Data Accessors that are to be invoked. In one embodiment of the invention, a window will be displayed in the GUI showing that the data retrieval process is in progress. Data retrieval progress can be indicated by a progress bar. The request of the user is asynchronous and goes through different stages that can take a considerable amount of time, depending on the complexity of the data retrieval request. While data retrieval is in progress, the screen will be blocked.

The second element of the Flexible Reporting GUI 1 for report management is a Report Designer 1b. The Report Designer 1b allows the user to design the report (i.e. select the data to be included in the report, format it, etc.). Data Accessors have limited data filtering capabilities. Users are typically interested in including more selective data sets than those retrieved by the Data Accessors. Data filtering is typically done from within a report designer application. This allows users to further refine the data selection beyond the main data categories tapped by the Data Accessors. The report designer application will typically provide business insight to users in an intuitive environment on a scalable platform. The report designer application will provide end-user insight through self-service information access, exploration, and interactivity. Through this application, users are able to ask spontaneous and iterative business questions of enterprise data. A report designer application typically establishes a versatile and user-friendly semantic layer on top of the raw database ensuring that users have controlled and secure information access.

Through the Report Designer 1b, the user can load a built-in report designer application and design the report. In the embodiment of the invention shown in FIG. 4, the user accesses this component by clicking on the tab labeled "Design Report." The report designer application is web-based. In a preferred embodiment of the invention, the report designer application is BO XI—WebI Designer (Business Objects, San Jose, Calif.). In DART, the Report Designer 1b weaves together the Operative System controls of the DART application and the Web-style interface of the report designer application in order to run a web-based report designer application in an integrated manner. In a preferred embodiment of the invention, the Operative System of the DART application is Microsoft Windows™.

During the report design process, users could benefit from visualizing the data selection criteria. This would allow users more freedom and control over their report design but also less involvement and dependency from IT specialists, which considerably shortens the report turn-around time. In the DART system, users can visualize the data selection criteria. In addition, the Report Designer 1b allows the user to directly design the report from scratch. In DART, the user is not restricted to a defined set of report templates.

Figure 4A:
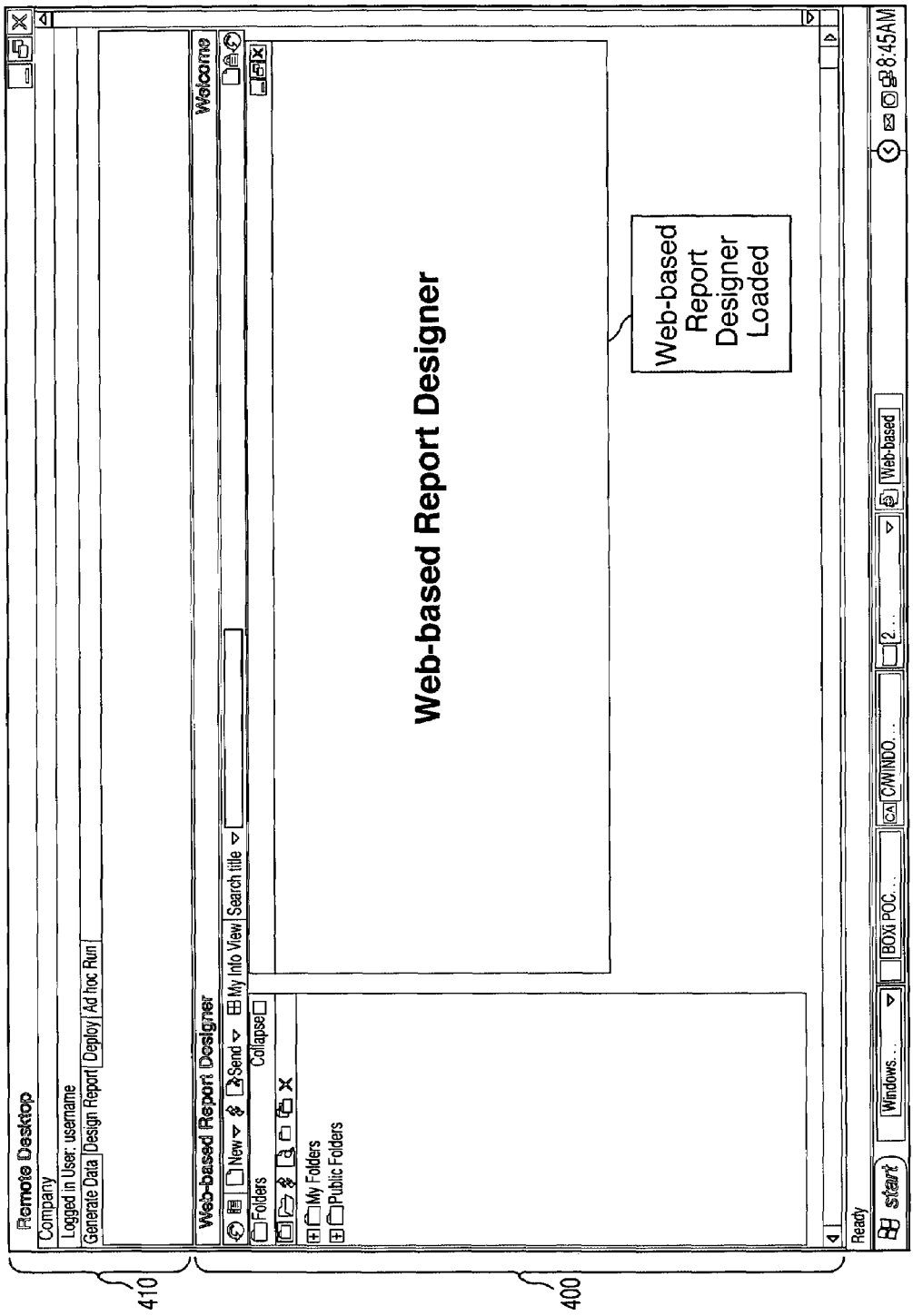
FIG. 4-6 display representative screen views of the Report Designer 1*b* GUI component in several embodiments of the invention.
Figure 4B:
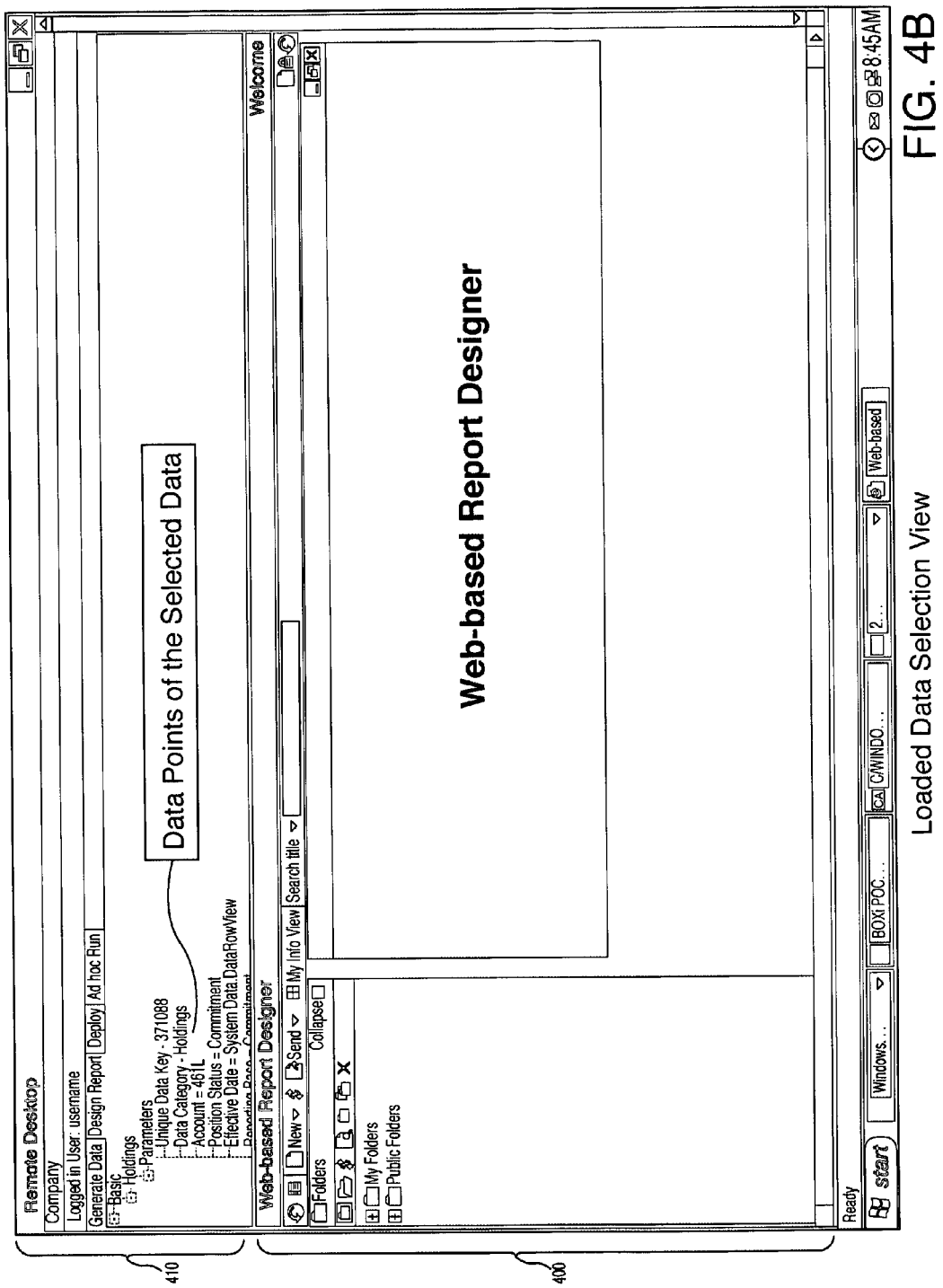

FIG. 4 shows two screen views of an embodiment of the invention using a web-based report designer application. The figure shows that when the user has selected the GUI Report Designer element 1b, the screen is divided into a bottom section 400 and a top section 410. The bottom section 400 displays the loaded report designer application and is under a web-browser control. In the embodiment of the invention represented in FIG. 4, the web browser is Dot Net 2.0 Web-Browser Control. This browser has all the features of Internet Explorer (JavaScript, Dynamic Hyper Text Markup Language, ActiveX, applets, plug-in), but does not include a toolbar, an address bar or a status bar. Within this screen view, the user will be notified about the completion of the data retrieval process. In addition, the user will be able to visualize the selection criteria and data points of the selected data in the top section 410 of the screen, which is under the control of the DART Operative System. Using a web-based viewing framework, a wide range of users can now access and explore secure information, significantly reducing the number of tools needed to be deployed. In this way, the user can design the report from the designer as desired. The user can for example select that the holdings be grouped by country, format the numbers and execute sums with each country. The user can also execute multiple queries. This will be particularly useful in the case unlinked data needs to be retrieved for complex reports.

Users will typically load the report designer application while the data is being retrieved through the Report Generator, such that these two process run in parallel. Once the report designer application is loaded, users can access the retrieved data through the report designer application semantic layer, and visualize the data in the staging tables in a convenient and user-friendly way. In the instances where a data request comprises multiple records in multiple tables in the staging database, the semantic layer of current vendor report design applications does not allow a rejoinder between these multiple records from multiple tables. In the DART system, this limitation is solved through a specially designed Controller Table 8a. Through this Controller Table 8a, the rejoinder of multiple records from multiple tables corresponding to the same data request (i.e. sharing the same Unique Key) will be effected. In the Controller Table 8a, all records within a staging table that belong to the same data request (i.e. that have the same Unique Key) will be joined in to a single record. The Controller Table 8a will be in the middle of the "Star" schema. In consequence, the semantic layer of the report designer application will be able function over this data structure, and read and appropriately interpret the retrieved data. Controller Table 8a is created from the Data Generator element 1a of the Flexible Reporting GUI 1.

Figure 5A:
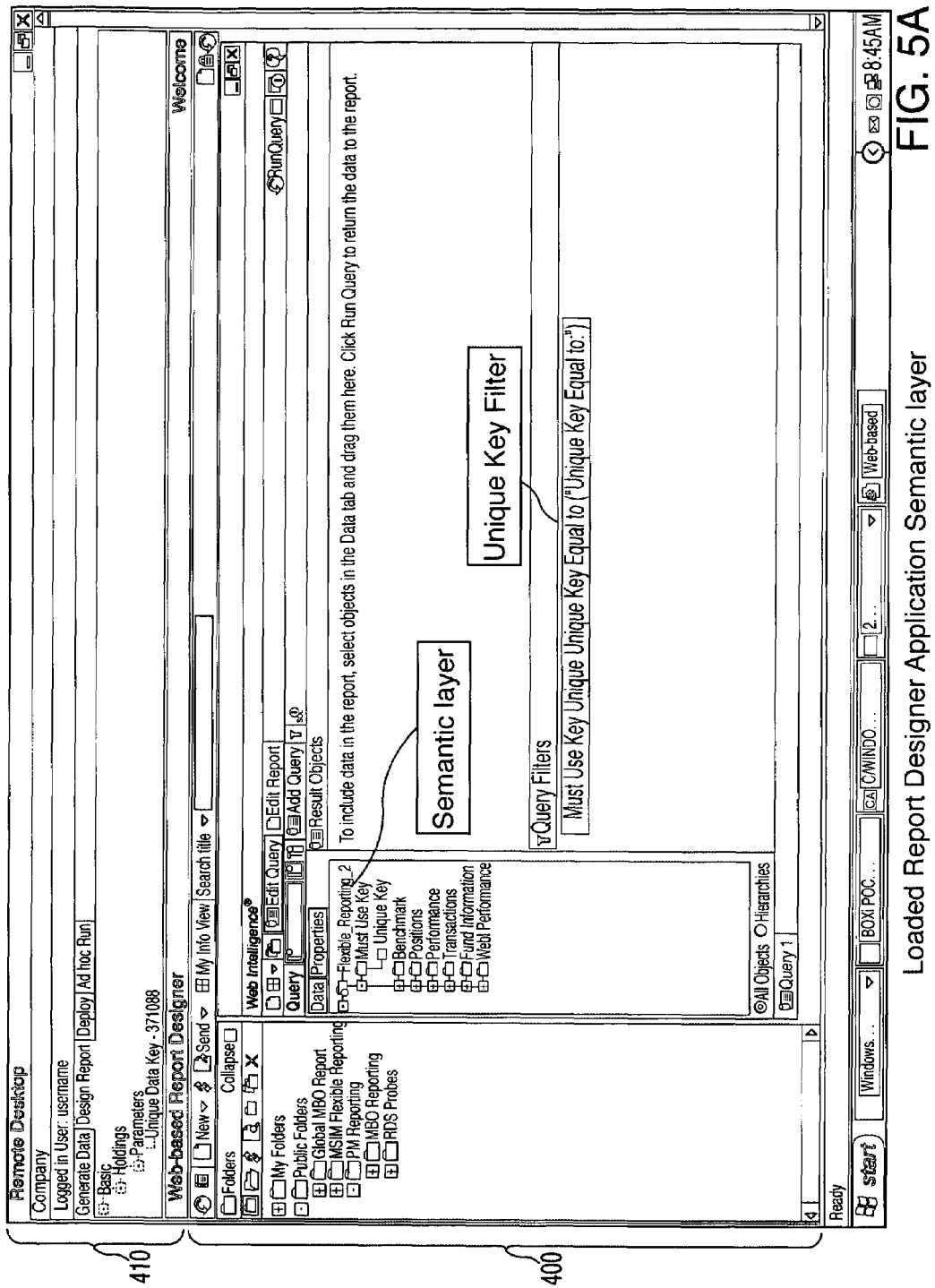
Figure 5B:
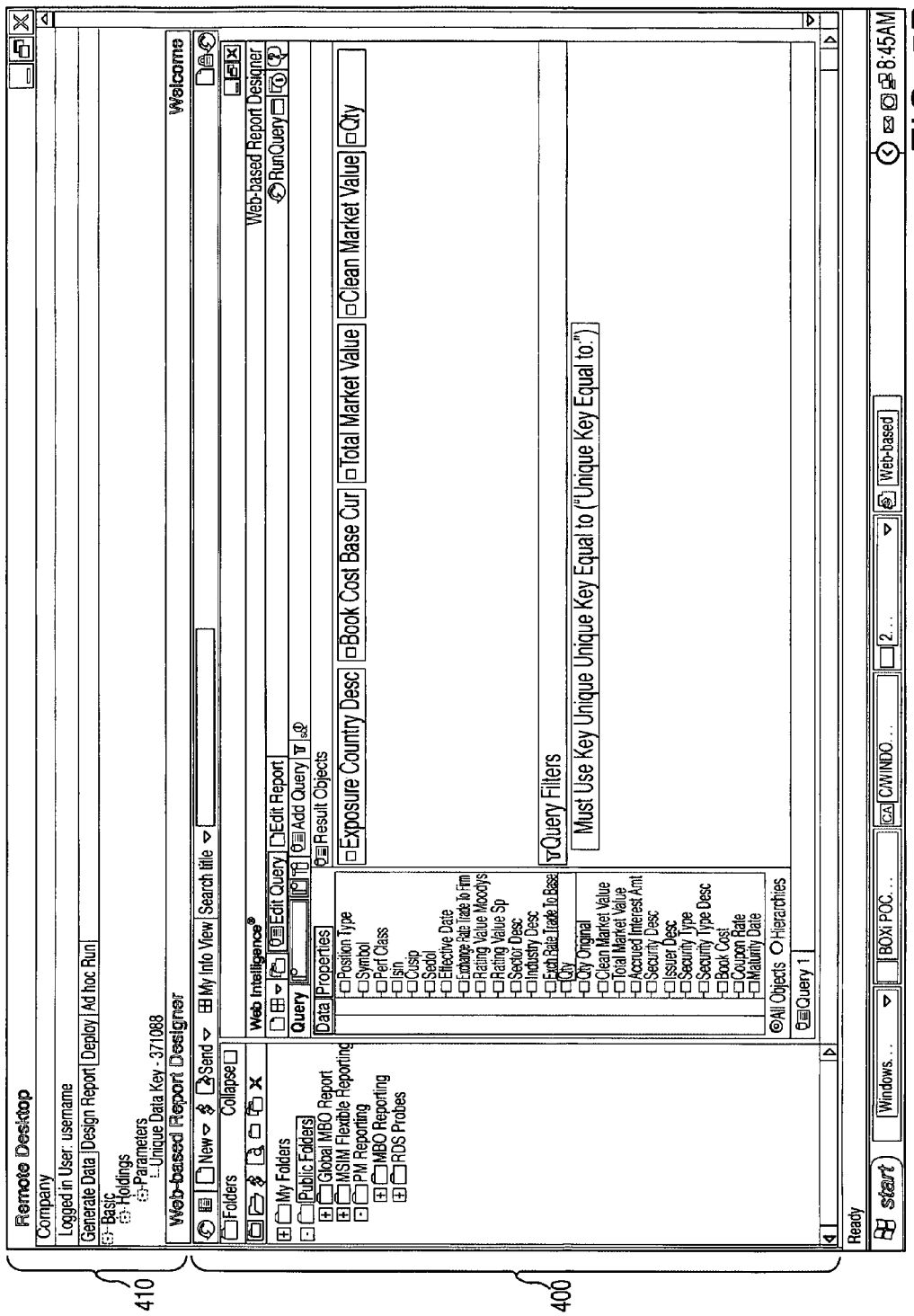

FIG. 5 shows two screen views of the Report Designer element 1b once the report designer application semantic layer has been loaded. As described earlier, the screen is divided into an Operative System-control top section 410 and a Web browser control section 400. Within the Web browser control section 400, the report designer application semantic layer appears to the left. In the windows to the right, the user can select the required data filters, by entering the appropriate Unique Key corresponding to the data request. If the user is interested in filtering the data beyond the filtering done by the Data Accessors, the user can also select the desired report fields or parameters. The parameters may be, for example, effective date (e.g., the date the report is to be run), position status (e.g., monthly audited, real time, etc.), reporting basis (e.g., commitment, settlement date), combined mode (e.g., if the user wishes to combine the selected reports), language mode (allows the user to choose a selected language), output format (e.g., PDF, spreadsheet, word processing document), etc. Each parameter may have an associated drop-down window or check field by which the user may select the desired value for the parameter.

The parameters may be set in different kinds of generic controls such as drop down boxes, checkboxes, and date boxes that can be given a name and setup, as mentioned earlier. Any new report can have one or more of these generic controls associated with it. Using the Report Designer element 1*b* of the GUI 1, a user can setup a report name and type information. Parameters can also be setup to be associated with other parameters. For example, parameters may have values that change when another parameter value changes. Parameters may contain lists of values (as in the case of drop downs). The source for these values can be specified at report setup time, and those sources can be from database tables or files, etc. For example, the user may select certain entities for the reports. For financial services applications, the entities may be, for example, portfolio IDs, account identifiers, product identities, broker names, etc. The values contained in this entity box could be coming from a table of portfolioID values.

The user may also select the source system, for example. This may be a filter condition, such as entities organized by office location within an enterprise. For the chosen entity type and source system, an entity selection dialog box may then display the available entities. The user may then specify the appropriate entities by double-clicking on them or using selection arrows. The selected entities may then be displayed to the user.

Figure 6B:
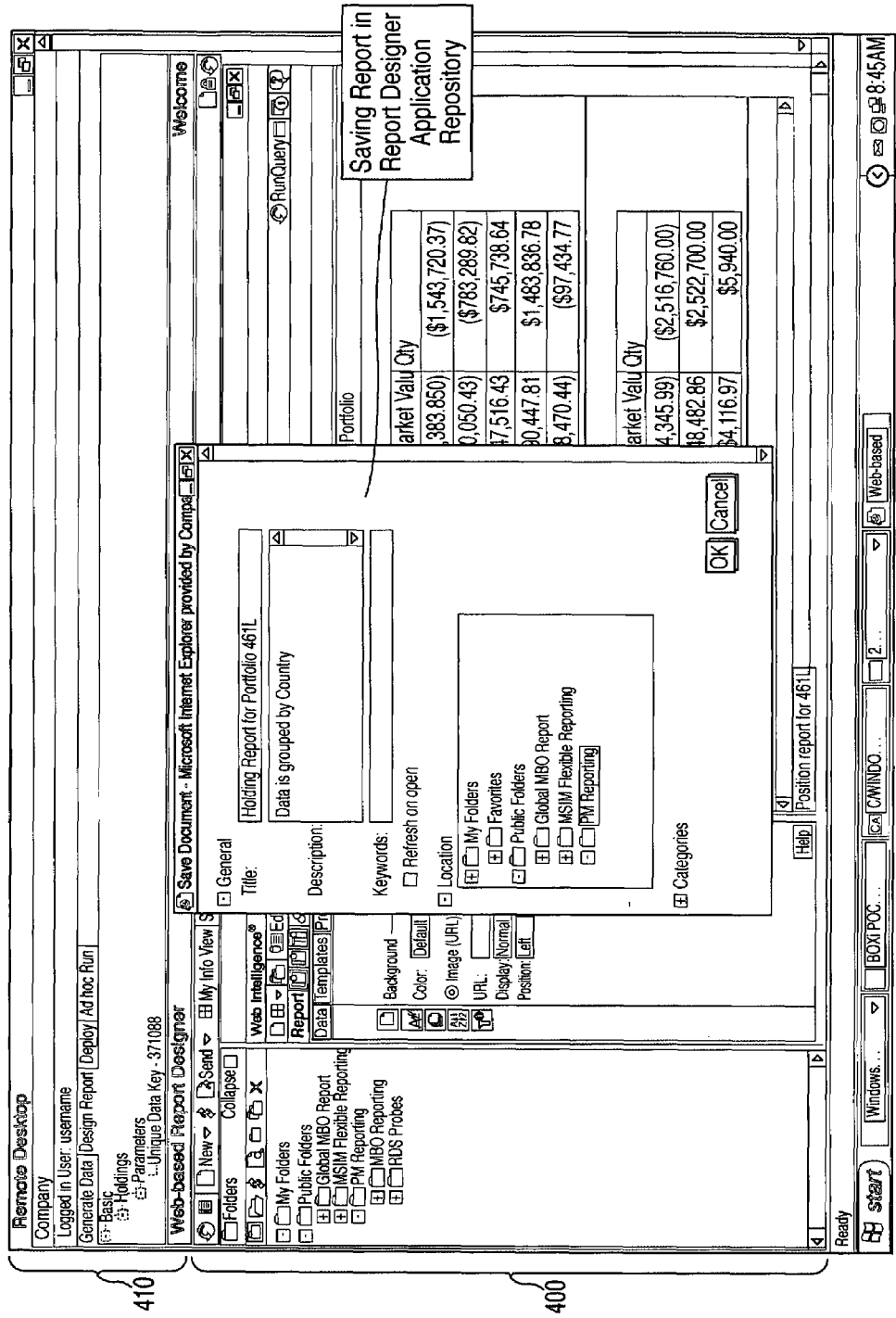

Once the report has been designed, it may be saved into one (or more) Report Repository 9 element(s), if the user desires to use the report in the future. Within the repository, the report will be stored with its location, name, description, report designer application internal identification number (ID), etc. . . . (i.e. report metadata). FIG. 6B shows that a window will be displayed to the user indicating that the report is being saved in the report designer application repository.

Next, the user may run the report, run the designed report at a later time, or run a report in an interactive mode. While the user may run the report from the designer application, when a user wants to design a report and run it at a later time, or when the report is to be run in an interactive mode, running the report from the report designer application has a number of limitations. One of these limitations is that the loading of the report designer application is slow and lengthy. Because this application is a web-based application, the application may become timed-out after a determined period of time. If the user has to reload the application every time a session is timed-out, a considerable amount of time will be added to the report turn-around time. The second limitation is that report designer applications are typically not optimized for routine report runs. In consequence, the report repositories of typical report design applications are not easy to navigate. Locating a saved report among the list of saved reports can be difficult as no searching capabilities are available. In addition, the data will not be saved in the report repository and re-retrieving the data is also cumbersome. Lastly, report designer applications typically do not have GUIs that are sufficiently user-friendly to enter the report run parameters. All these limitations complicate the navigation of users through the report designer application for report run purposes. These limitations lengthen the turn around time of reports. In the DART system, these limitations are overcome by running the reports as described below.

Figure 7:
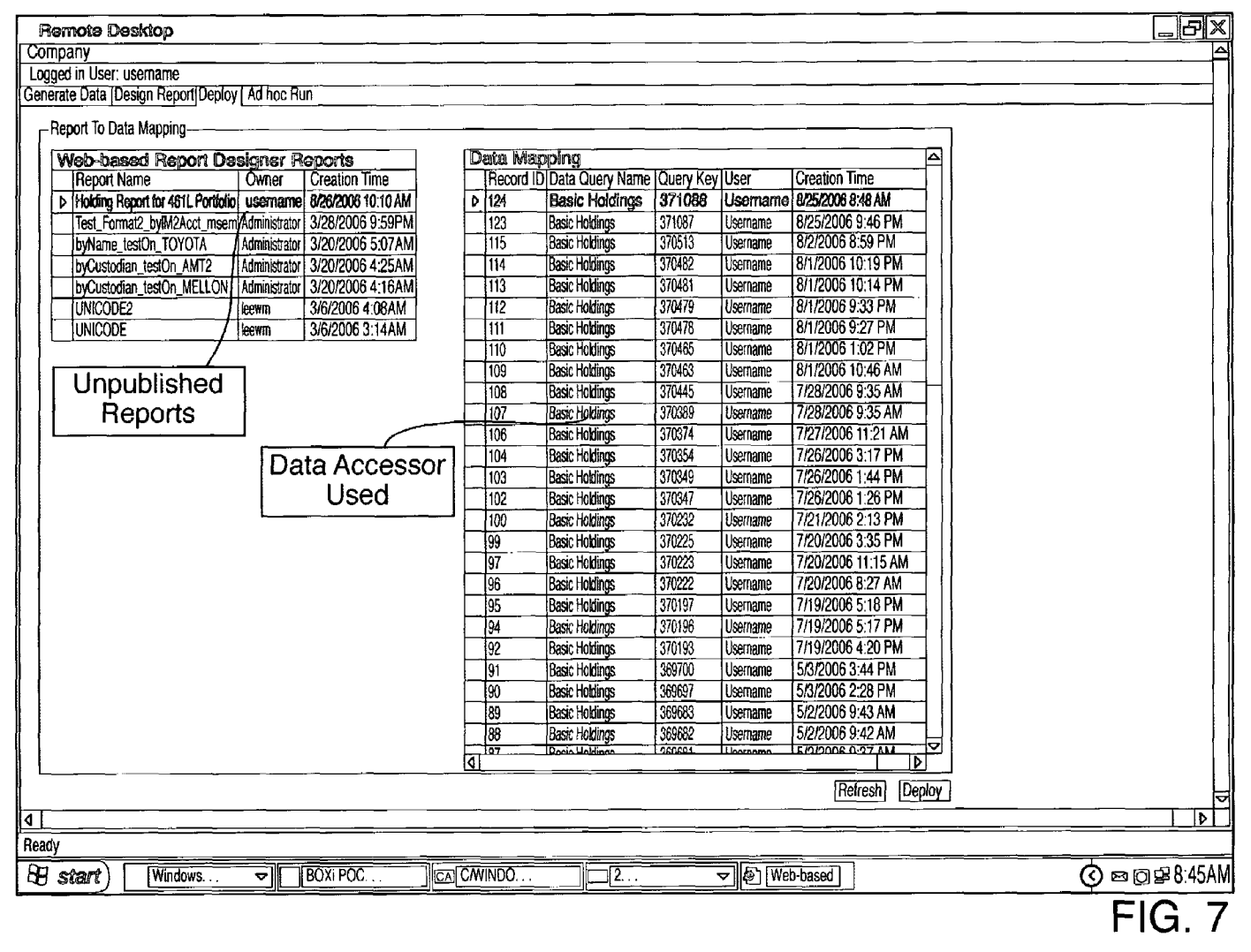

DART first extracts the metadata from the report that the user has designed in the report designer application, and stores such metadata in a Reports Metadata Database 4. This step is known as the report deployment or publication and it is effected through the third element of the GUI 1, the Report Deployment element 1C. The user may access this Report Deployment element 1C when the user desires to design a report and run it at a later time, or when the report is to be run in an interactive mode. In the embodiment of the invention shown in FIG. 7, the user accesses this component by clicking on the tab labeled "Deploy." The Report Deployment element 1 C uses a report designer application SOAP Application Program Interface (API) to extract the metadata from the report designed by the user in the report designer application. FIG. 7 shows a screen view of the display of the Report Deployment element 1 C in one embodiment of the invention. Through a report designer application SOAP API, Report Deployment element 1 C reconciles the list of reports that have not been deployed (displayed on the left window in the embodiment of FIG. 7) with those reports that have been deployed earlier. Report Deployment element 1 C displays the Data Accessors used to retrieve the data to be included in the reports (displayed on the right window in the embodiment of FIG. 7), so that they can be linked with the each one of the reports. The user is provided with the option to click on a "Deploy" button and trigger the deployment of the metadata. Upon this, the Report Deployment element 1 C invokes the Reporting Architecture 5 to store the report metadata in the Report Metadata Database 4.

The Report Metadata Database 4 may include one or multiple tables that together include reports, associated parameters for the reports, default values for the parameters, and the workflow steps (the steps that the must be invoked for execution) for reports. The Report Metadata Database 4 also may store the entitlements of the user. When the user logs in, Reporting Architecture 5 may retrieve the entitlements of the user from Report Metadata Database 4 or from a different database to determine the available report categories for the particular user, and a display window may only list those report categories. When, for example, a user logs on in a client session, the Reporting Architecture 5 may query the Report Metadata Database 4 to determine the report parameters that the user is entitled to based on the entitlements of the user, the parameters that the reports need, and the default values for the parameters. These data are then communicated back to the GUI 1. These data are used by the GUI 1 when the user chooses to run a report(s) or save a report to run it through a batch process (i.e. not in real-time), by saving a batch report run request. If the user selects to edit or otherwise view the parameters from a previously-defined run request, the Reporting Architecture element 5 may retrieve the relevant parameters (e.g., dates etc. . . . ) from the Report Metadata Database 4, as detailed later, and communicate the data back to the client GUI.

In one embodiment of the invention, Report Metadata Database 4 may also store metadata relating to the user display configuration. Report Metadata Database 4 could be tailored to satisfy any relevant parameter and could easily be modified to include new parameters.

As stated earlier, the Reporting Architecture element 5 and the Report Metadata Database 4 may be implemented as one or a number of computing devices (e.g., PCs, servers, mainframes, etc. . . . ) programmed to provide the services. According to one embodiment, one instance of the combination of the Reporting Architecture element 5 and the Report Metadata Database 4 may be implemented on a common computer device(s). According to other embodiments, each service may be provided by a separate computer device(s).

For redundancy purposes, the system 100 may include multiple Reporting Architecture elements 5, and multiple Report Metadata Databases 4, etc., although only one of each is shown in FIG. 1 for purposes of simplicity. For this reason, the system 100 may include a router (not shown), which may provide load balancing for the multiple instances of the system 100 architecture. For example, if one of the Reporting Architecture elements 5 goes down, the router may route a run request traffic from the client terminal(s) to available Reporting Architecture elements, Report Metadata Databases, etc. Also, the router may provide a single point of reference for the system 100. That is, for example, the client terminals need only communicate with the system 100 using the physical IP address for the router port, rather than establishing separate communication sessions with the Reporting Architecture element 5 or the Report Metadata Database 4. That way, as long as the messages from the client terminals have a tag indicating the address of the destination of the message, such as to the Reporting Architecture element 5 or the Report Metadata Database 4, the router can appropriately route the incoming messages. One advantage of this arrangement is that the client terminal does not need to be made aware of changes in the address for the Reporting Architecture element 5 or the Report Metadata Database 4, for example.

Finally, DART allows the user to run the report through the fourth element of the GUI, the Report Run element 1d. This element allows a user to run a report in either an Ad-hoc (i.e. in real-time) or in a batch process fashion (i.e. running a report at a specified later time). To run the report, the Report Run element 1d is connected to the Report Metadata Database 4, from which it retrieves all the report metadata. In the embodiment of the invention shown in FIG. 8, the user accesses this component by clicking on the tab labeled "Run/Schedule." Through this interface, the reports available for immediate execution and the corresponding data accessors are presented to the user. From this interface, an authorized user can run a report in a convenient and easy to use fashion. While DART still performs a two step process (data retrieval and report generation), the users can initiate a report run by clicking a single button.

The Report Run element 1d is also connected to the Reporting Architecture 5 through which it can run the Data Accessor Parameters selected by the user. For the selected report, Reporting Architecture 5 may read from the Report Metadata Database 4 the relevant parameters for that report and show them in a display window.

Figure 8:
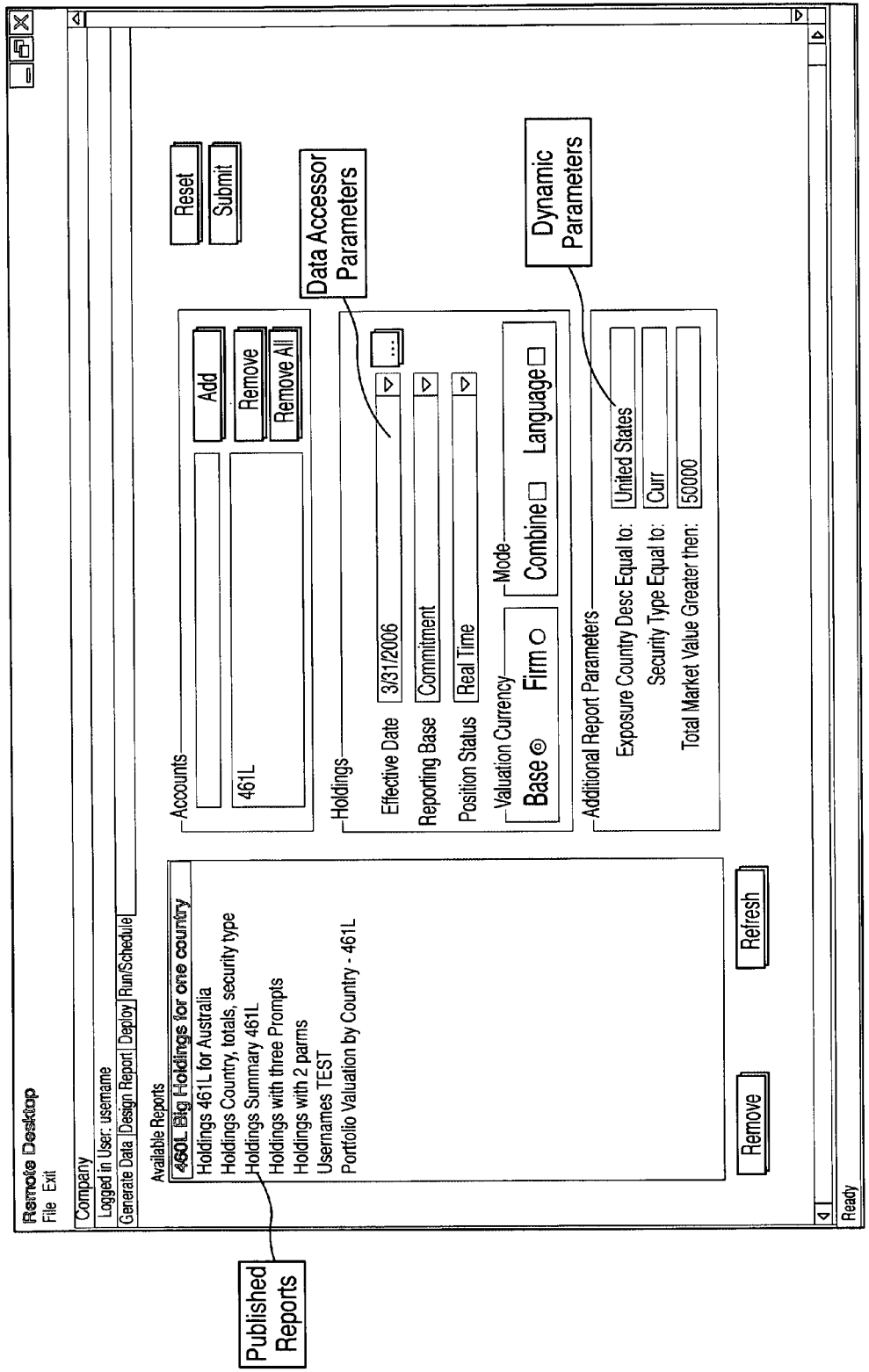
FIG. 8 displays a representative screen view of the Report Run 1*d* GUI Component in one embodiment of the invention.

The Report Run element 1d can also use the report designer application SOAP API to obtain additional dynamic parameters selected during the report design. This is depicted in FIG. 8, which shows a screen view of the Report Run element 1d in one embodiment of the invention. On the left side, the user can visualize the published (i.e. deployed) reports. On the right side of the screen, the user can visualize the Data Accessor Parameters and the extra, Dynamic Parameters, if any. The user can also use the report designer application API to run the report.

In one embodiment of the invention, the user may check some or all of the requests for running by checking the checkbox next to the request and then clicking the "Submit" button. When this is done, a message box (not shown) may appear to inform the user that the report has been submitted. In one embodiment of the invention, when a run request is completed, a message box will be displayed for the user indicating the status of the run request. For example, the message box may inform the user that the request was successfully run, or it may inform the user that an error occurred in executing the run request. In such circumstances, the message may also include an error code.

In DART, data retrieval is under direct control of the user through the Data Generator element 1a of the Flexible Reporting GUI 1. By having direct control of the data retrieval process, the actual retrieval of data commences a short time (e.g. one or a few minutes) prior to the report design, providing a much more updated, almost perfectly current data set. This data retrieval system used by DART is an intermediate solution to the prior art alternatives of data retrieval mentioned earlier (i.e. data warehouse creation at determined intervals vs. virtual memory tables). Through this solution, costly data warehouses, intensive and complex periodic data loads, and performance and scalability issues are avoided. Compact and well designed staging tables are shared between all users, and at the same time provide a clear separation of the data requested by for each report. A Unique Key is assigned to each data recorded in each data request.

If at run time, the user chooses to request a batch run, the run request will be executed through the Batch Process element 3 in conjunction with an Scheduler element 2. In an embodiment of the invention the Scheduler element 2 is Autosys Scheduler. The Scheduler element 2 allows a user to enter the parameters that will define how the report will be run in a batch fashion (time of the running, frequency, etc. . . . ). The run request definition instructions will be typically stored in the Batch Process element 3. For scheduled reports in a batched mode, the Batch Process element 3 may retrieve the parameters for the report run request and communicate them to the Report Run element 1d for execution. The schedule information may then appear in the display window.

In one embodiment of the invention, a display window may include tabs for previously saved run requests of the user. Clicking on one of these tabs may cause the display window to display the fields associated with creating the run request described previously. The values of the various parameter fields for the run request may be populated with the values entered by the user in creating or editing the report run request.

In another embodiment of the invention, once the report has been run, it can be output in a chosen format and distributed to a number of specified parties. To that effect, the delivery format and destination options for the reports should also be specified. In a preferred embodiment of the invention, the report format will be Excel or PDF. The user may also specify the destination of the report(s), such as internet e-mail, internal printer, external fax, internal file transfer, external e-mail, external file transfer, etc. . . . In a preferred embodiment of the invention, the report will be distributed via e-mail. The user may then specify the recipient address for the chosen distribution means. The number of destinations that a user gets to select from may also be driven by entitlements.

In another embodiment of the invention, when multiple reports are selected, the user may specify how the reports are to be packaged. For example, the user may be permitted to sort the reports such that the selected reports appear in a specified order. For some file formats, the user may also specify how the reports are to be merged.

In another embodiment of the invention, the system 100 may also include a Language Translator Adapter 20. The Language Translator Adapter 20 may interface with a Dictionary Look-Up application 22 to translate the report into various languages, as requested by the user in creating the report.

In another embodiment of the invention, the system 100 may also include a Bundling Adapter 30 in communication with a Bundling Application 32. The Bundling Application 32 may bundle multiple reports into one bundled report, and in a particular order, pursuant to the report creation parameters input by the user, as discussed earlier.

In another embodiment of the invention, the system 100 may also include a Distribution Adapter 40 for interfacing with Distribution Systems 42 that distribute the final report 10. For example, the reports may be directed to various printers or fax machines for hard-copy print outs of the reports.

Also, the reports may be distributed by an email system to various email recipients. Also, the final reports may be transferred as a file to a recipient over a data transfer network using, for example, FTP.

For purposes of simplicity, only one instance of each component/adapter is shown in FIG. 1, although it should be recognized that multiple instances of the components/adapters may be used. A second router (not shown) may be used for load balancing of multiple instances of the components/adapters. Also, according to various embodiments, the routing functions of the two routers may be handled by a single router.

In another embodiment of the invention, the Reporting Architecture element 5 may be communication with data sources external to the system and other applications for purposes of retrieving data, designing reports, extracting report metadata, running, bundling and distributing the reports, etc. . . .

Figure 9:
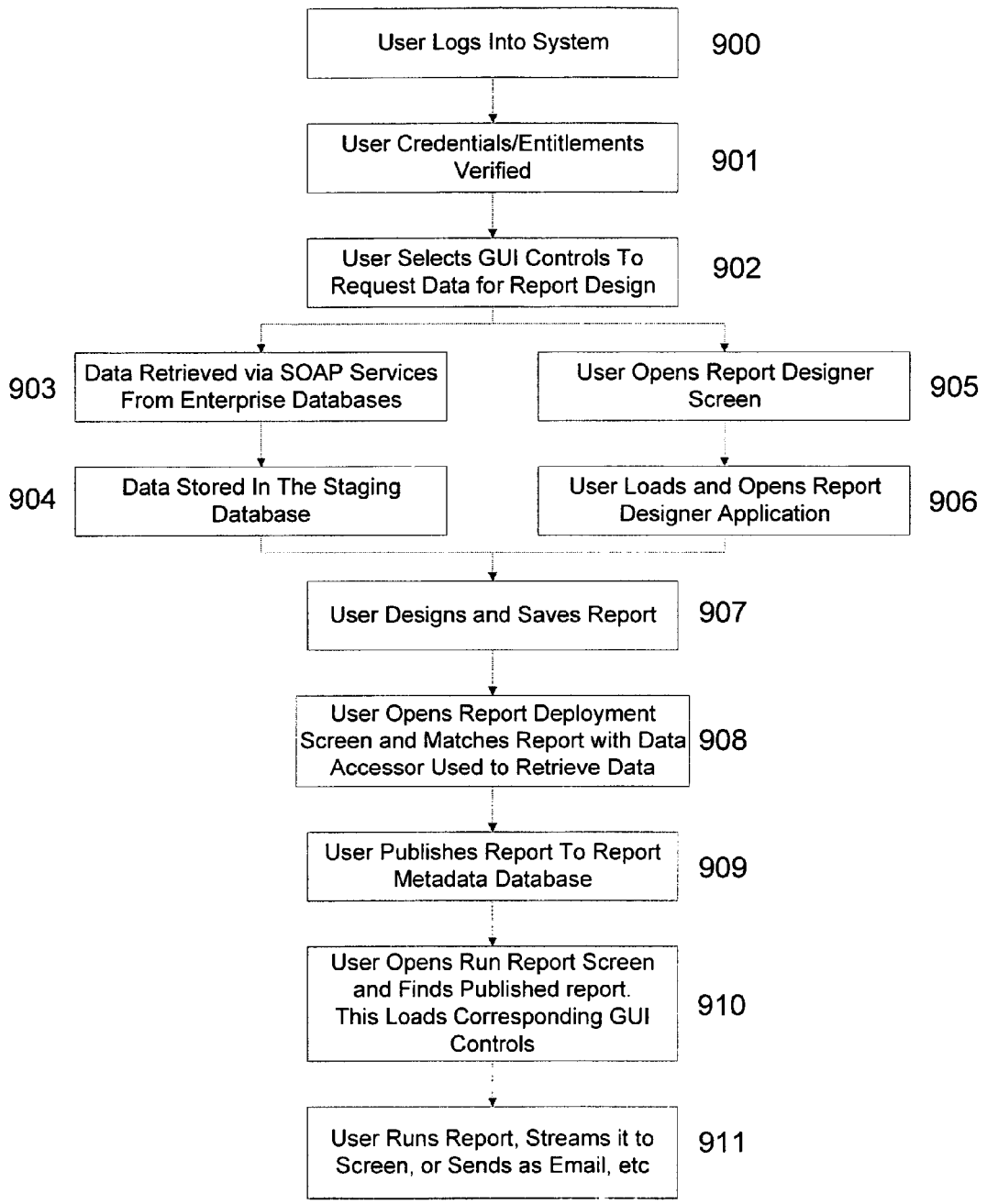
FIG. 9 is a summary flowchart of the steps followed by the system of the invention to produce a report.

FIG. 9 is a flowchart of the operation of the system 100 according to various embodiments. At step 900, the user starts the Flexible Reporting GUI 1. As an initial step, the user may log into the system from a client terminal. At step 901, the user credentials and entitlements are verified by the system at the back-end (e.g. the Report Architecture 5). At step 902, the user launches the Data Generator 1a component of the Flexible Reporting GUI 1 to request data for the design of the report. The user selects the Data Accessors needed for retrieving the data to be included in a report from a Data Accessor Menu, and submits the request to the Reporting Architecture 5. At step 903, the data requested by the user is retrieved via Data (SOAP) Services 6 from the Enterprise Databases 7. At step 904, the retrieved data are stored in the Reporting Database (staging tables) 8. At this step, multiple records within a staging table that are associated with the same Unique Key are linked into a single record in the Controller Table 8a. While steps 903 and 904 are in progress, the user can open the Report Designer 1b screen at step 905 and load the report designer application. In the report designer application, the user chooses the field and parameter values for the report (i.e. designs the report), as indicated in step 907. The user can then save the report into a Report Repository 9. At step 908, if the user is interested in running the report at a later time, the user opens the Report Deployment 1c screen and matches the designed report with the Data Accessor/s used to retrieve the data. At step 909, the user can publish the report, by saving the report metadata in the Report Metadata Database 4. At step 910, the user opens the Run Report screen and finds the published reports. The user uses this user-friendly GUI to find the saved report the user desires to run and select it. This will result in the loading of the corresponding GUI controls. Finally, at step 911, the user runs the report. This is done by invoking Reporting Architecture 5 through a message request. The message might have all the report names and their parameter value information. Upon receipt of the request, Reporting Architecture 5 may make a call to the Reports Metadata Database 4 to ask for the workflow definition of the report, i.e., the components that this report has to invoke in order to finish the execution of the report. Reporting Architecture 5 may then split the incoming message into a number of smaller messages for sending to the components/adapters, e.g., components 20, 30, 40, 22, 32, 42. These smaller sub-messages may also be SOAP XML messages. Each component in turn might send back responses to the Reporting Architecture 5 with some indication of a success/failure and any other information that it generated which is useful for a subsequent workflow step.

If, returning to step 910, the user desired to save a report run request for later execution, the user can choose the desired reports and the associated parameters, including the run schedule. Upon submission by the user, the scheduled run request is saved to the Batch Process element 3. At the appropriate time, the Batch Process element 3 in conjunction with the Scheduler element 2 initiates execution of the scheduled run request by sending a message to the Reporting Architecture 5. The message to the Reporting Architecture 5 may identify the run request by the run request name. Reporting Architecture 5 then retrieves the report and parameter value information from the Reports Metadata Database and constructs a report run request based on the retrieved information. The process then advances to step 911, described above. Once the report is run, it can be streamed to the screen or sent as e-mail.

One of skill in the art will recognize that the system of the invention 100 merges together the process of retrieving data, designing the report, publishing the report, and running the report. In the prior art systems, some of these steps would be typically carried out by an IT specialist (or more). In the system of the invention, the reports are generated, designed, published and run in the same single client application.

DART decouples Data Gathering and Reporting processes into two independent processes. Each process can be implemented differently, without affecting the other process. This makes DART very flexible. Each process can be implemented with different technologies, or vendor products. Each process can have different development cycles. Each process can respond to new requirements independently.

This results in the following improvements: a) the turn around time of the reports is considerably shortened; b) the users are in control of the designing and deployment processes without the required involvement of one or more IT specialists; and c) greater flexibility is provided to the users to modify their reports, or generate quick reports for a single use (i.e. the data query tool).

One of skill in the art will also recognize that an additional advantage of the system of the invention is that the generation and maintenance of an expensive data source is avoided. The staging database can be any existing database resource from any vendor. There is no need to build an expensive data warehouse. The data does not have to be retained in the staging database for longer time, because it can be regenerated any time upon a demand from a user.

One of skill in the art will also recognize that a further advantage of the system of the invention is that a larger number of report formats are supported, because there is no limitation on the designer. Business users can use any report designer which can produce the formatting, quality, and the output format they desire.

One of skill in the art will also recognize that a further advantage of the system of the invention is that the turnaround time is dramatically reduced. Since business users have direct control on both processes, without any IT support, they can get data into the staging table, from any data source, at any time. They can use any report designer, to produce any report format they desire. They can adjust and modify report formatting on the fly with the report designer they choose. Without depending on IT supports, business users have full control of when and what reports will be available.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distribute modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. The client access device can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

While several embodiments of the invention have been described, it should be apparent, however, that various modifications, alterations and adaptations to those embodiments may occur to persons skilled in the art with the attainment of some or all of the advantages of the present invention. For example, various steps of the processes described herein may be performed in different orders. Also, while the description above generally concerned report in the financial services industry, it should be recognized that the system could be used for other types of reports in other industries. It is therefore intended to cover all such modifications, alterations and adaptations without departing from the scope and spirit of the present invention as defined by the appended claims.

Thus, it will be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall there between.

What is claimed is:

1. A computer-implemented method for designing a new report template and running a new report comprising:
   (i) displaying, via a client computer device and a data generator component of a graphical user interface, a plurality of data category fields each associated with a data category to be used in designing a new report template;
   (ii) receiving, via the client computer device and a data generator component of a graphical user interface, a selection of one or more data categories to be used in designing the new report template, wherein each data category field corresponding to the selected one or more data categories enables the selection of one or more data retrieval parameters, wherein each data category is associated with a data accessor for retrieving data from one or more enterprise databases, and wherein each data accessor targets for retrieval data associated with its corresponding data category, whereby a user designing the new report template need not know the underlying data structure of the one or more enterprise databases;
   (iii) receiving, by one or more computer devices comprising at least one processor and an operatively associated computer readable medium, in response to a data retrieval request initiated via the graphical user interface, selected data retrieval parameter values;
   (iv) invoking the data accessors associated with the data categories, retrieving data from the one or more enterprise databases based on the selected data retrieval parameter values and storing the retrieved data in a staging database, wherein the data structure of the staging database comprises a plurality of staging tables corresponding to the data categories and a controller table, wherein the retrieved data for a given data retrieval request is stored as a plurality of records in the staging tables that are linked by a unique key assigned by the one or more computer devices;
   (v) designing the new report template, where designing the new report template comprises, via the client computer device, a report designer component of the graphical user interface, and a report designer application: (a) receiving a selection of report fields for the new report template, (b) receiving a selection of report parameters for refining data selection for the new report template, and (c) accessing and displaying the retrieved data from the staging tables, whereby the user is enabled to design the new report template;
   (vi) storing the new report template in a report repository, wherein the stored new report template does not include the data retrieved by the accessors and used to design the new report template;
   (vii) linking, via the client computer device and a report deployment component of the graphical user interface, a selected report template with data accessors previously used to retrieve data during the new template design process, and triggering the storing of metadata for the selected report template in a reports metadata database;
   (viii) generating a new report based on data retrieved from the reports metadata database, wherein generating further comprises the steps of, via said client computer device and a run report component of the graphical user interface: specifying the report template for the new report to be run, specifying parameter values for the new report, and retrieving data for the new report based on the data accessors linked to the specified report template.

2. The method of claim 1, further comprising:
   extracting the metadata from the report template via an application programming interface of the report designer application.

3. The method of claim 1, wherein said designing step further comprises loading the report designer application.

4. The method of claim 1, wherein said report designer application is a web based application.

5. The method of claim 1, wherein the generating step comprises a run method selected from the group consisting of: an ad hoc run method and a batch run method.

6. A computer-readable data storage medium comprising instructions stored thereon, that when executed by a computer comprising one or more processors, cause the one or more computer processors to:

(i) generate a user interface comprising:
   a data generator component;
   a data report designer component;
   a report deployment component; and
   a report run component for; and (ii) display, via said data generator component, a plurality of data category fields each associated with a data category to be used in designing a new report template;

(iii) receive, via said data generator component, a selection of one or more data categories to be used in designing the new report template, wherein each data category field corresponding to the selected one or more data categories enables the selection of one or more data retrieval parameters, wherein each data category is associated with a data accessor for retrieving data from one or more enterprise databases, and wherein each data accessor targets for retrieval data associated with its corresponding data category, whereby a user designing the new report template need not know the underlying data structure of the one or more enterprise databases;

(iv) receive, in response to a data retrieval request initiated via the graphical user interface, selected data retrieval parameter values;

(v) invoke the data accessors associated with the data categories, retrieve data from the one or more enterprise databases based on the selected data retrieval parameter values and store the retrieved data in a staging database, wherein the data structure of the staging database comprises a plurality of staging tables corresponding to the data categories and a controller table, wherein the retrieved data for a given data retrieval request is stored as a plurality of records in the staging tables that are linked by a unique key assigned by the one or more computer devices;

(vi) design the new report template, where designing the new report template comprises, via said report designer component and a report designer application: (a) receiving a selection of report fields for the new report template, (b) receiving a selection of report parameters for refining data selection for the new report template, and (c) accessing and displaying the retrieved data from the staging tables, whereby the user is enabled to design the new report template;

(vii) store the new report template in a report repository, wherein the stored new report template does not include the data retrieved by the accessors and used to design the new report template;

(viii) link, via said report deployment component, a selected report template with data accessors previously used to retrieve data during the new template design process, and trigger the storing of metadata for the selected report template in a reports metadata database; and (ix) generate a new report based on data retrieved from the reports metadata database, wherein generating further comprises the steps of, via said run report component: specifying the report template for the new report to be run, specifying parameter values for the new report, and retrieving data for the new report based on the data accessors linked to the specified report template.

7. The data storage medium of claim 6, further comprising instructions for causing the one or more computer processors to:
   extract the metadata from the report template via an application programming interface of the report design application.

8. The data storage medium of claim 6, wherein said designer component loads the report designer application.

9. The data storage medium of claim 1, wherein said report designer application is a web based application.

10. The data storage medium of claim 6, wherein the said report is run with a run method selected from the group consisting of: an ad hoc run method and a batch run method.

11. A computer-implemented reporting system for designing and running a new report template comprising:
   at least one client computer terminal;
   one or more computing devices programmed to retrieve data, design report templates, store metadata and run reports, and that communicate with:
      (a) at least one enterprise database;
      (b) a staging database, wherein the staging database comprises staging tables;
      (c) a reports metadata database, wherein the reports metadata database comprises one or more tables that store metadata;
   a data network to connect the at least one client computer terminal to the one or more computing devices; and
   wherein the at least one client computer terminal enables a user to access a graphical user interface comprising:
      a data generator component;
      a data report designer component;
      a report deployment component; and
      a report run component; and
   one or more computer processors configured to:

(i) display, via said data generator component, a plurality of data category fields each associated with a data category to be used in designing a new report template;

(ii) receive, via said data generator component, a selection of one or more data categories to be used in designing the new report template, wherein each data category field corresponding to the selected one or more data categories enables the selection of one or more data retrieval parameters, wherein each data category is associated with a data accessor for retrieving data from one or more enterprise databases, and wherein each data accessor targets for retrieval data associated with its corresponding data category, whereby a user designing the new report template need not know the underlying data structure of the one or more enterprise databases;

(iii) receive, in response to a data retrieval request initiated via the graphical user interface, selected data retrieval parameter values;

(iv) invoke the data accessors associated with the data categories, retrieve data from the one or more enterprise databases based on the selected data retrieval parameter values and store the retrieved data in a staging database, wherein the data structure of the staging database comprises a plurality of staging tables corresponding to the data categories and a controller table, wherein the retrieved data for a given data retrieval request is stored as a plurality of records in the staging tables that are linked by a unique key assigned by the one or more computer devices;

(v) design the new report template, where designing the new report template comprises, via said report designer component and a report designer application: (a) receiving a selection of report fields for the new report template, (b) receiving a selection of report parameters for refining data selection for the new report template, and (c) accessing and displaying the retrieved data from the staging tables, whereby the user is enabled to design the new report template;

(vi) store the new report template in a report repository, wherein the stored new report template does not include the data retrieved by the accessors and used to design the new report template;

(vii) link, via said report deployment component, a selected report template with data accessors previously used to retrieve data during the new template design process, and trigger the storing of metadata for the selected report template in a reports metadata database; and (viii) generate a new report based on data retrieved from the reports metadata database, wherein generating further comprises the steps of, via said run report component; specifying the report template for the new report to be run, specifying parameter values for the new report, and retrieving data for the new report based on the data accessors linked to the specified report template.

12. The system of claim 11, wherein the graphical user interface is implemented as software code executed by a processor of the at least one client computer terminal.

13. The system of claim 11, wherein the graphical user interface is implemented as software code executed by a processor of a remote server.

* * * * *